United States Patent
Cho (10) Patent No.: US 9,736,997 B2
(45) Date of Patent: Aug. 22, 2017

(54) BINDING MACHINE FOR AGRICULTURE

(71) Applicant: Nam Sun Cho, Daegu (KR)

(72) Inventor: Nam Sun Cho, Daegu (KR)

( * ) Notice: Subject to any disclaimer, the term of this patent is extended or adjusted under 35 U.S.C. 154(b) by 775 days.

(21) Appl. No.: 14/146,422

(22) Filed: Jan. 2, 2014

(65) Prior Publication Data
US 2015/0181810 A1    Jul. 2, 2015

(51) Int. Cl.
*A01F 1/04* (2006.01)
*A01G 17/08* (2006.01)

(52) U.S. Cl.
CPC .................................. *A01G 17/085* (2013.01)

(58) Field of Classification Search
CPC ...................................................... A01F 17/085
USPC ....................................................... 227/120
See application file for complete search history.

(56) References Cited

U.S. PATENT DOCUMENTS

| | | | | |
|---|---|---|---|---|
| 2,946,059 A | * | 7/1960 | Wandel ................ | B25C 5/1686 227/130 |
| 2,959,786 A | * | 11/1960 | Peterssen ............... | B25C 5/085 227/130 |
| 3,009,156 A | * | 11/1961 | Lerner ................... | B25C 5/085 227/114 |
| 3,076,195 A | * | 2/1963 | Jopp ..................... | B25C 5/1603 227/123 |
| 3,116,487 A | * | 1/1964 | Schick ................. | B25C 5/0207 227/120 |
| 3,279,673 A | * | 10/1966 | Cairatti ................ | B25C 5/0278 227/108 |
| 3,385,498 A | * | 5/1968 | Downie ................ | B25C 5/1693 227/120 |
| 3,476,301 A | * | 11/1969 | Auston .................... | B25C 5/06 227/120 |
| 3,476,302 A | * | 11/1969 | Hurd ........................ | B25C 5/06 227/120 |
| 3,603,497 A | * | 9/1971 | Nishikawa ........... | A01G 17/085 140/121 |
| 3,848,789 A | * | 11/1974 | Baker ...................... | B65C 3/02 227/120 |
| 5,150,826 A | * | 9/1992 | Logtens ................. | B25C 5/085 227/120 |
| 5,397,045 A | * | 3/1995 | Lucas ..................... | B65B 27/10 227/105 |

(Continued)

FOREIGN PATENT DOCUMENTS

| ES | WO 2004091284 A1 * | 10/2004 | ............. B65B 25/02 |
|---|---|---|---|
| FR | 2861542 A1 * | 5/2005 | ........... A01G 17/085 |

(Continued)

*Primary Examiner* — Hemant M Desai
*Assistant Examiner* — Lucas Palmer
(74) *Attorney, Agent, or Firm* — Hauptman Ham, LLP (57) ABSTRACT

Disclosed is a binding machine for agriculture which is used when binding, using a binding tape, a crop to a pole which is previously installed near the crop so as to keep in places the stems or branches of various crops. A steel needle standby groove is formed at an inner side of the steel 5 needle exit of the steel needle supply part loaded with binding steel needles, and when steel needles are extruded, the steel needle is separated from the steel needle group and stands by in the steel needle standby groove, and in the steel needle extrusion plate, a steel needle separation protrusion is formed at a side surface 10 in the direction of the steel needle standby groove, and then the binding steel needle is extruded.

2 Claims, 13 Drawing Sheets

(56) References Cited

U.S. PATENT DOCUMENTS

| | | | | |
|---|---|---|---|---|
| 6,382,289 B1 * | 5/2002 | Jho | ................ | A01G 17/085 100/16 |
| 2004/0237805 A1 * | 12/2004 | Hayashi | ................ | B65B 13/345 100/1 |
| 2005/0028497 A1 * | 2/2005 | Hayashi | ................ | A01G 17/085 53/592 |
| 2007/0023474 A1 * | 2/2007 | Smith | ................ | B25C 5/0207 227/155 |
| 2013/0125461 A1 * | 5/2013 | Seo | ................ | A01G 17/085 47/1.01 S |

FOREIGN PATENT DOCUMENTS

| | | | | |
|---|---|---|---|---|
| JP | WO 2007023763 A1 * | 3/2007 | ............ | A01G 17/085 |
| KR | 2191713 A1 * | 6/2010 | ............ | A01G 17/085 |

* cited by examiner

BINDING MACHINE FOR AGRICULTURE

TECHNICAL FIELD

The present invention relates to a binding machine for agriculture which is used when binding, using a binding tape, a crop to a pole which is previously installed near the crop so as to keep in place the stems or branches of various crops, and in particular to a binding machine for agriculture which makes it possible to mitigate a worker's work load and to obtain a precise binding work which is generally done using a steel needle along with an enhanced reliability in work by preventing the possible errors in machine, the advantages of which are obtained in such a way that when tying a binding tape by extruding a binding steel core of a binding machine through an exit, a work for extruding a binding steel needle can be done easily with less force.

BACKGROUND ART

The binding machine for agriculture has features in that a number of binding steel needles are adhered with their sides being arranged to be neighbored to each other and are loaded into a steel needle supply part of a binding machine. Each steel needle is separated by a steel needle extrusion plate which is installed at an exit of the same and operates by a pressure of an operation lever, and the separated steel needle is pushed out through the exit of the steel needle supply part and is engaged to a binding tape. When the binding steel needle is extruded by pressing the operation lever, the steel needle extrusion plate is separated one by one from a steel needle group and is pushed to an outer side of the exit and is engaged to the binding tape; however the above described work is continuously and quickly performed, it needs to supply a certain pressure at a time. For this, the operation of the lever requires a lot of force when the worker starts operating the lever, as a result of which the worker may be easily tired and exhausted when working for a long time. Since a certain resistance which occurs in the middle of the operation of the machine is great, the steel needle extrusion plate may be transformed, so it does not come into contact with the pressing position of the binding steel needle for thereby deteriorating the binding accuracy, which results in the errors in operation and bad workability.

DISCLOSURE OF THE INVENTION

Accordingly, the present invention is made to improve the problems encountered in the conventional art and it is an object of the present invention to provide a binding machine for agriculture.

To achieve the above object, there is provided a binding machine for agriculture which has features in that a steel needle standby groove is formed at an inner side of a binding steel needle exit of a steel needle supply part, so a steel needle can standby in the steel needle standby groove until it is separated from the steel needle group and can extrude out. A steel needle separation protrusion is formed at a certain portion of a side surface which is formed in the direction of the steel needle standby groove in the steel needle extrusion plate. With this construction, when a separated binding steel needle is extruded out, the next extruding steel needle is separated from the steel needle group and can standby in the steel needle standby groove. The binding steel needle extrusion can be therefore performed smoothly, and less force is required in the middle of the extrusion and forming step, and the worker may be less tired while reducing errors in machines.

Advantageous Effects

The binding machine for agriculture according to the present invention has the following advantageous effects. The binding steel needle group is loaded into the steel needle supply part of the body of the binding machine, and the operation lever is pressed when it needs to start a binding work, and the steel needle extrusion plate is inputted into the input port of the steel needle exit, and the steel needle extrusion plate is inputted into the input port, and the steel needle which standbys in the steel needle exit is pushed out, and the pushed steel needle moves toward the steel needle bending and forming groove through the binding tape. Both ends of the steel needle are bent by a steel needle bending and forming part, and the binding tape is bound. A cutting knife cuts off the outer portions of the bound tape for thereby finishing a binding work.

The present invention has features in that when the steel needle extrusion plate pushes out a binding steel needle, the steel needle separation protrusion attached to a side surface of the binding steel needle extrusion plate separates out one steel needle attached to the steel needle group and moves it toward the steel needle exit, and the separated binding steel needle stands by in the standby groove, and the binding steel needle, which has been first separated and stands by, is extruded to the extrusion plate and comes out of the steel needle exit and comes to bind the tape. When the steel needle extrusion plate returns back, it separates from the steel needle group, and the binding steel needle, which stands by in the standby groove, receives a pressure from the spring and moves to the steel needle exit and stands by at the steel needle exit. The front end of the steel needle group comes into close contact with the side surface of the standby binding steel needle. For the sake of the next work, when the steel needle extrusion plate is inputted into the input port, the standby binding steel needle is pushed by the steel needle extrusion plate, and it moves to the steel needle exit. When the binding steel needle staying at the steel needle exit comes out of the exit and is bound to the binding tape, the steel needle separation protrusion formed at the side surface of the steel needle extrusion plate comes into contact with the bonding part of the steel needle group for thereby separating one by one the steel needles, and the separated steel needles are moved from the traveling path of the extrusion plate to the standby groove in the middle of the steel needle separation procedure. As the above mentioned procedures are repeatedly performed, the binding steel needle separation work and the extrusion forming work are separately performed, so it is possible to push out the steel needle more smoothly with less force as compared with when operating the operation lever and to bind the binding tape. Thanks to the above mentioned step-by-step procedures, less force is required when pushing out the steel needle extrusion plate along with decreased resistances, which results in smoothly pushing out the extrusion plate. For this, works becomes easier, and binding work can be accurately performed for thereby enhancing work efficiency. Any transformation of the extrusion plate can be prevented, and possible errors in machines can be prevented. The durability of machines can be enhanced. When binding the support string to the agricultural crop instead of the pole, the support strip 15 is forced to pass through the support strip guide groove 3e formed between the outer side of the steel needle exit and the binding steel needle bending and forming part 5b for thereby binding the binding steel needles, which makes the works easier.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

In a binding machine for agriculture in which a steel needle supply part 3 loading a steel needle group formed by bonding with an adhesive a plurality of steel needle 10a with their edges being close to one another is provided in the interior of a binding unit body 1, and at its front end is formed a steel needle exit 3a, and a spring 11 is disposed so as to push the steel needle group to the steel needle exit from the opposite side, and a steel needle cover 30 is formed at an inner side of the steel needle supply unit 3, and an input port 30a is formed at a front end for allowing a steel needle extrusion plate to come in and go out, and a steel needle extrusion plate 12 is attached vertical to the binding unit body, so one binding steel needle can be pushed out through the input port of the steel needle extrusion plate, and a tape cutting compartment 3c and a tape discharge compartment 8 are formed at the front portion of the binding unit body, and the tape storage compartment 2a is provided at the rear end of the binding unit body 1 for installing a tape reel, and the binding tape 20 can be supplied to the tape discharge compartment 8, and an ascending and descending operation part 5, which can return back with the aid of the returning spring 501, is connected to a rotary shaft 5a on the top of the binding unit body 1, and at the front end of the ascending and descending operation member 5 are disposed a tape tugging unit 6 equipped with a tugging needle 601, and a binding steel needle bending and forming part 5b for thereby descending the ascending and descending operation part, and the operation plate 603 of the tape tugging part 6 is compressed against the operation protrusion of the binding unit body 1, so the tugging steel needle operates inwards and pecks at an end portion of the binding tape which stays in the tape discharge compartment for thereby forming a binding ring 20a, and both ends of the binding ring are bound by a binding steel needle 10a, and the outer side of the engaging part 20b is cut off by a cutting knife 7, and with the above-described construction, a binding work can be repeatedly performed, the present invention is directed to the binding machine for agriculture which comprises a steel needle standby groove 3b formed at an inner side surface of a boundary unit in the direction of the steel needle supply part in the steel needle exit 3a of the steel needle supply part 3; a steel needle separation protrusion 12a which is disposed at an inner side surface of the steel needle extrusion plate 12 and has a width enough to push out one steel needle with a certain distance from an end portion of the steel needle extrusion plate 12; and a guide groove 30b which is formed at the center of the input port 30a formed at the front end of the steel needle cover 30 for thereby allowing the steel needle separation protrusion to pass.

The present invention has further features in that a guide wall 3d is formed at left and right outer sides of the steel needle exit 3a of the steel needle supply part, and a support strip guide groove 3e is further provided so as to accommodate the support strip 15 between the guide walls.

The support strip guide groove 3e has features in that a guide wall 3d is formed at left and right sides of the steel needle exit 3a by covering a guide cover over the outer surfaces of the steel needle supply part 3, and between the guide walls is formed a support strip guide groove 3e. When the support strip 15 is supported in the support guide groove 3e, the support strip is positioned between the top of the steel needle exit 3a and the steel needle bending and forming part 5b, so it can be positioned stable in place. Thanks to the above mention configuration, the steel needle can pass through the center of the support strip when the steel needle is engaged, and the support strip and the binding tape can be bound with one steel needle.

Figure 4:
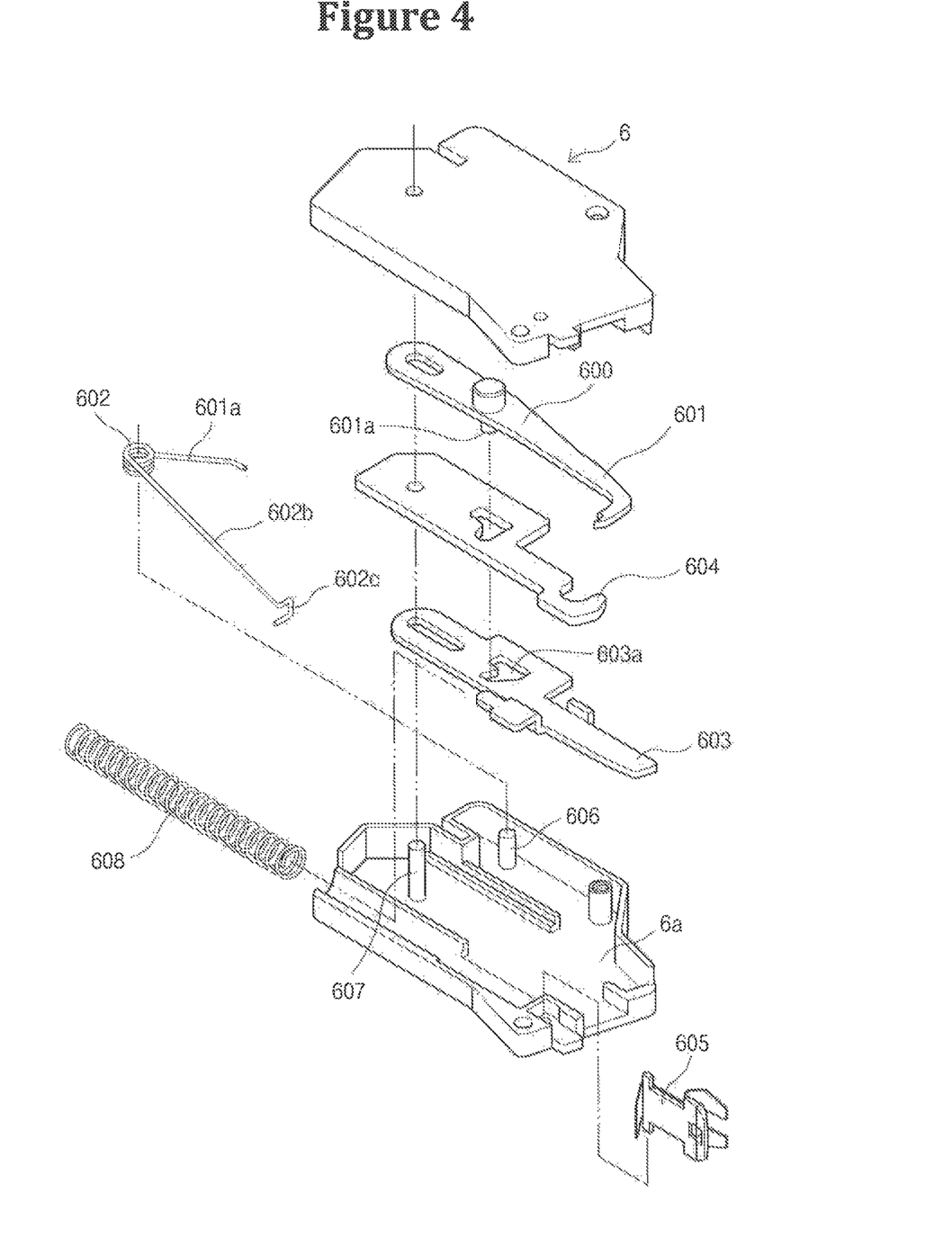
FIG. 4 is a disassembled perspective view illustrating a tape tugging part according to the present invention.
Figure 5:
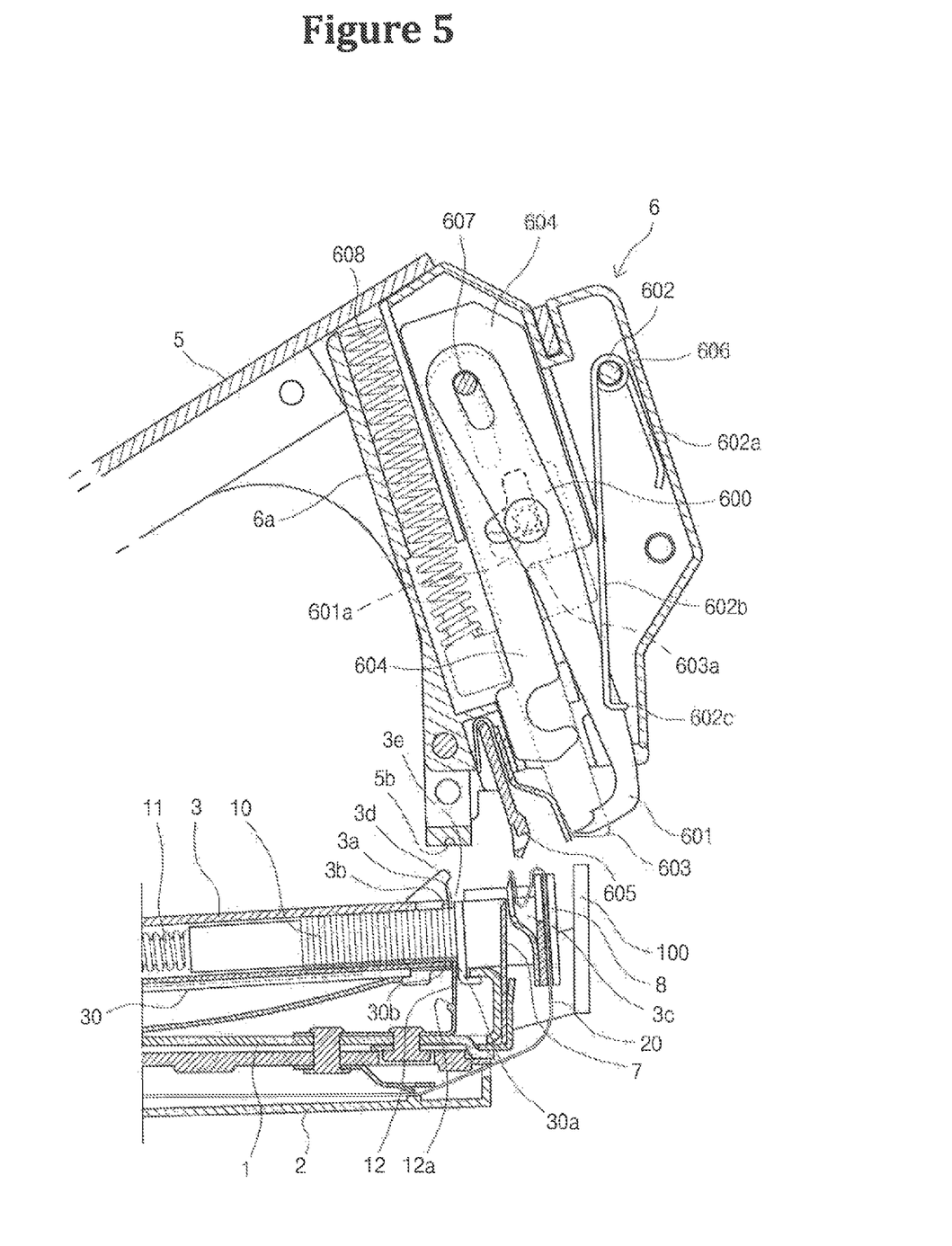
FIGS. 5 to 8 are views illustrating the operations of a tape tugging part.
Figure 6:
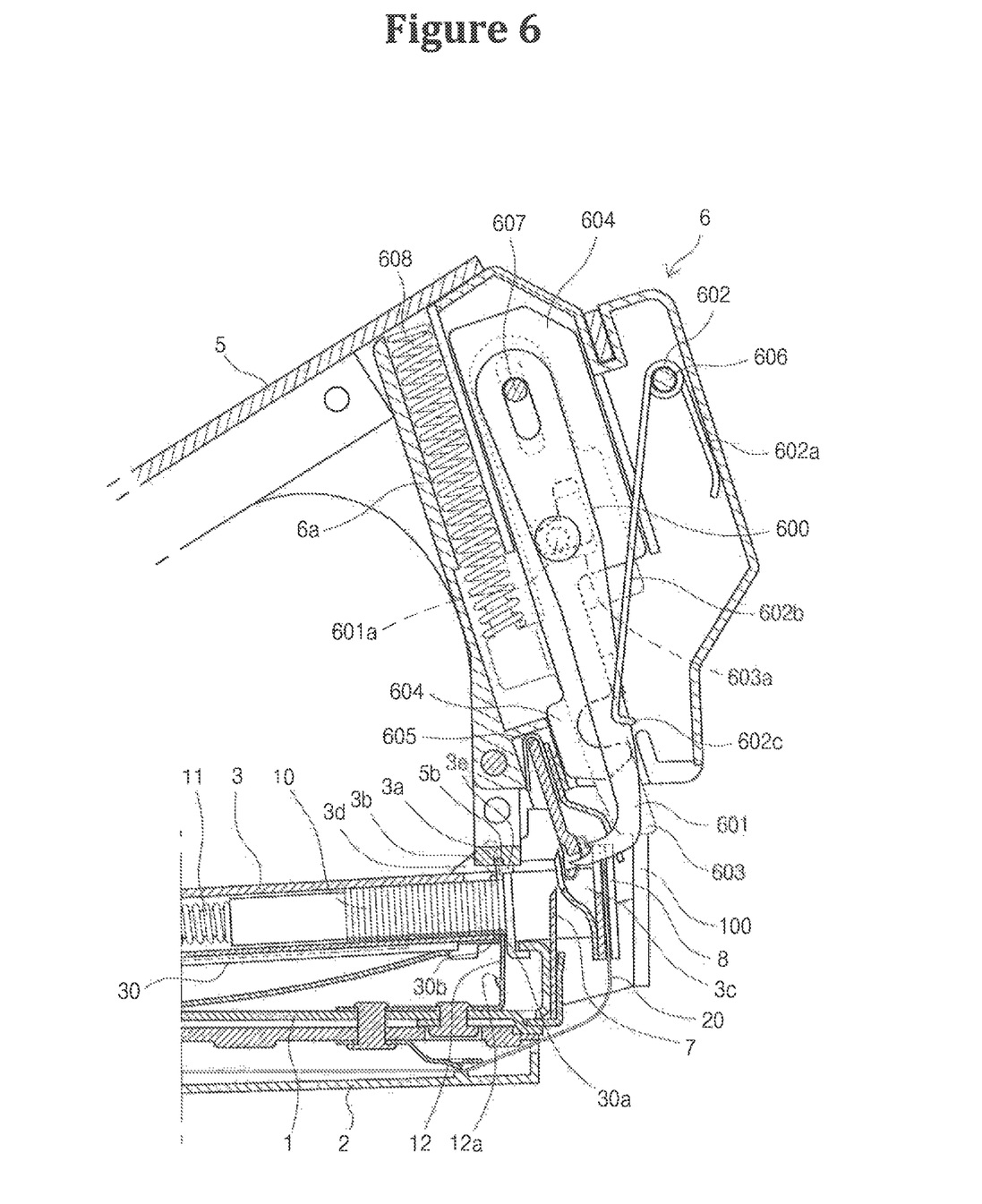
Figure 7:
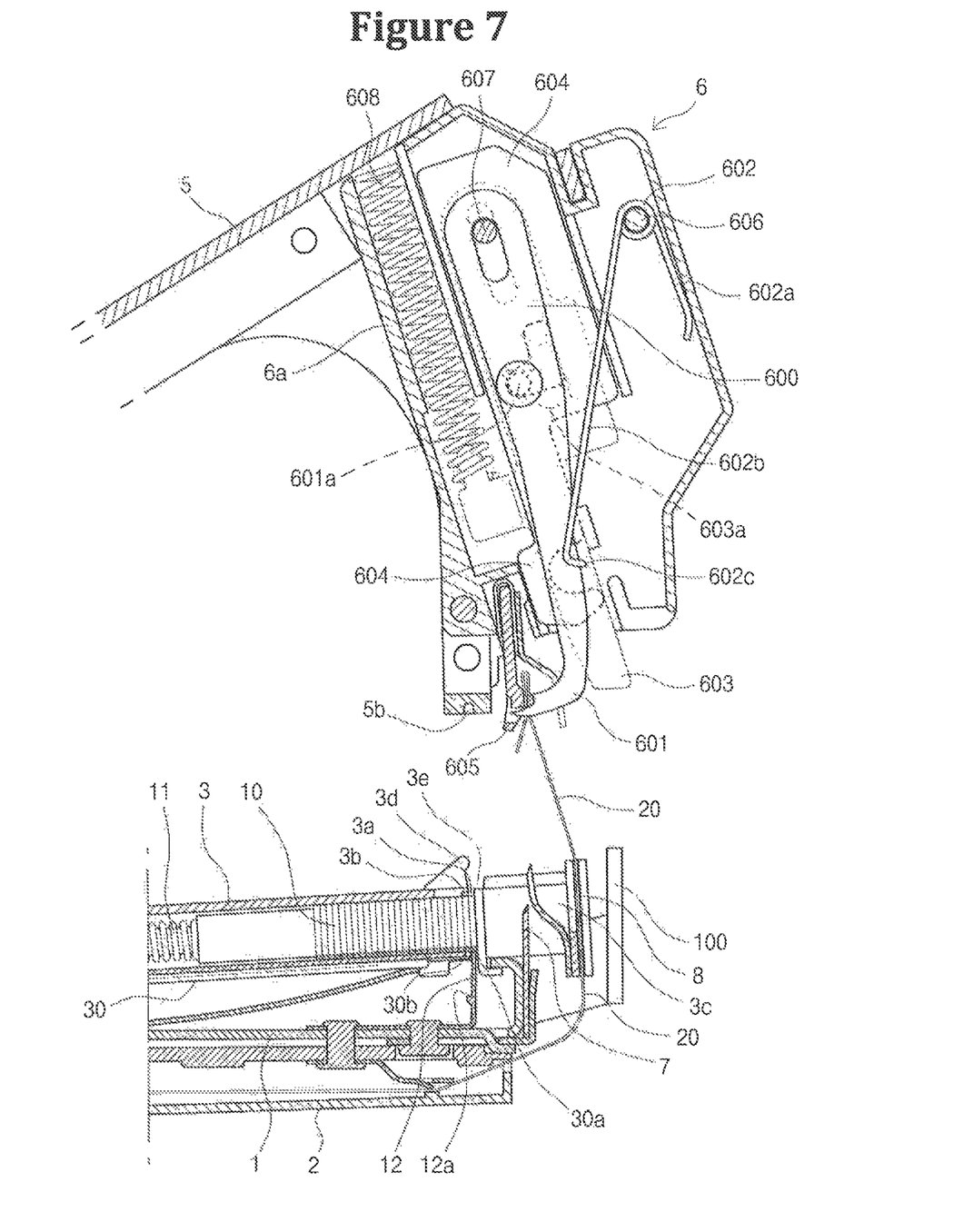
Figure 8:
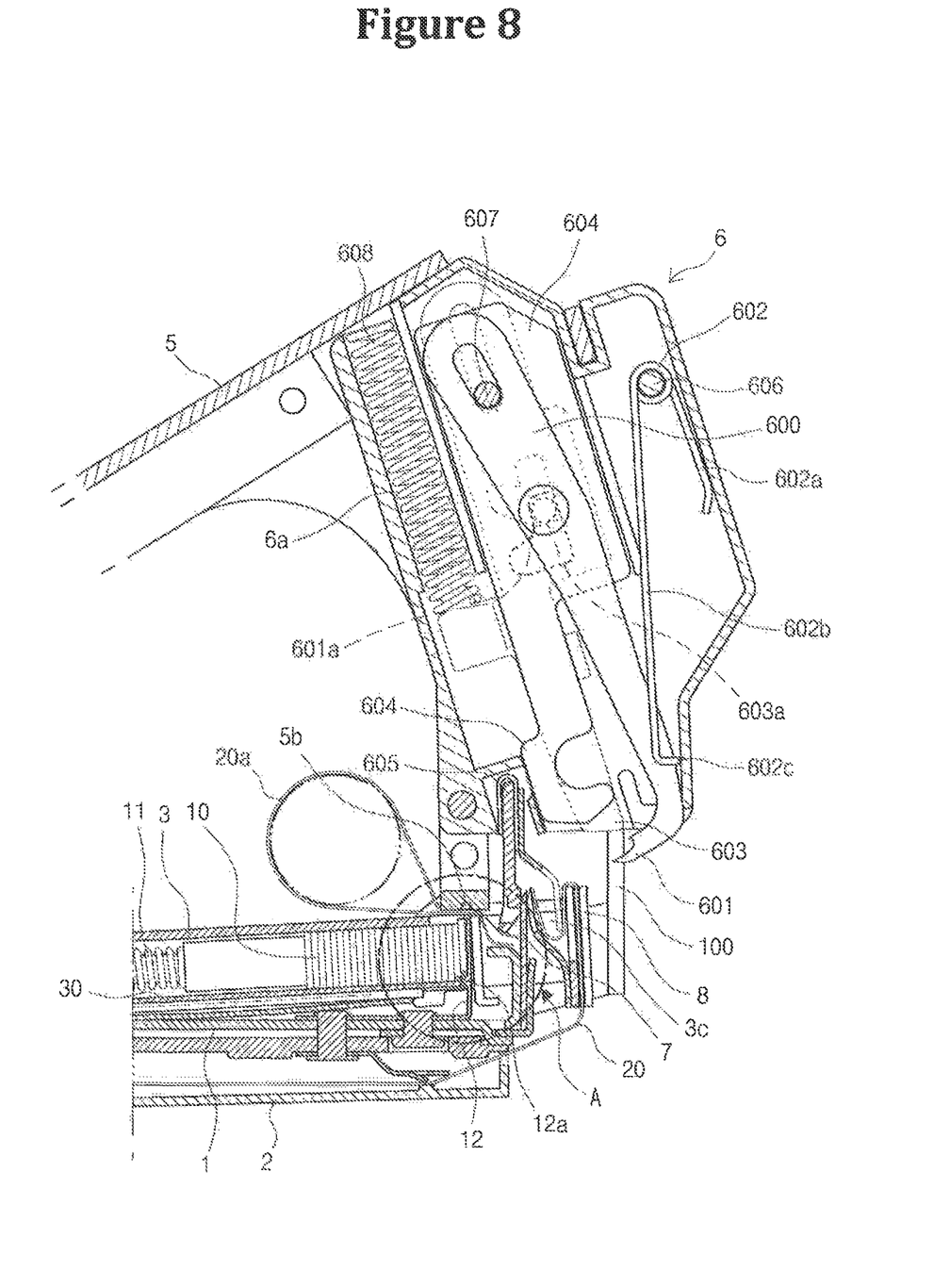
Figure 9:
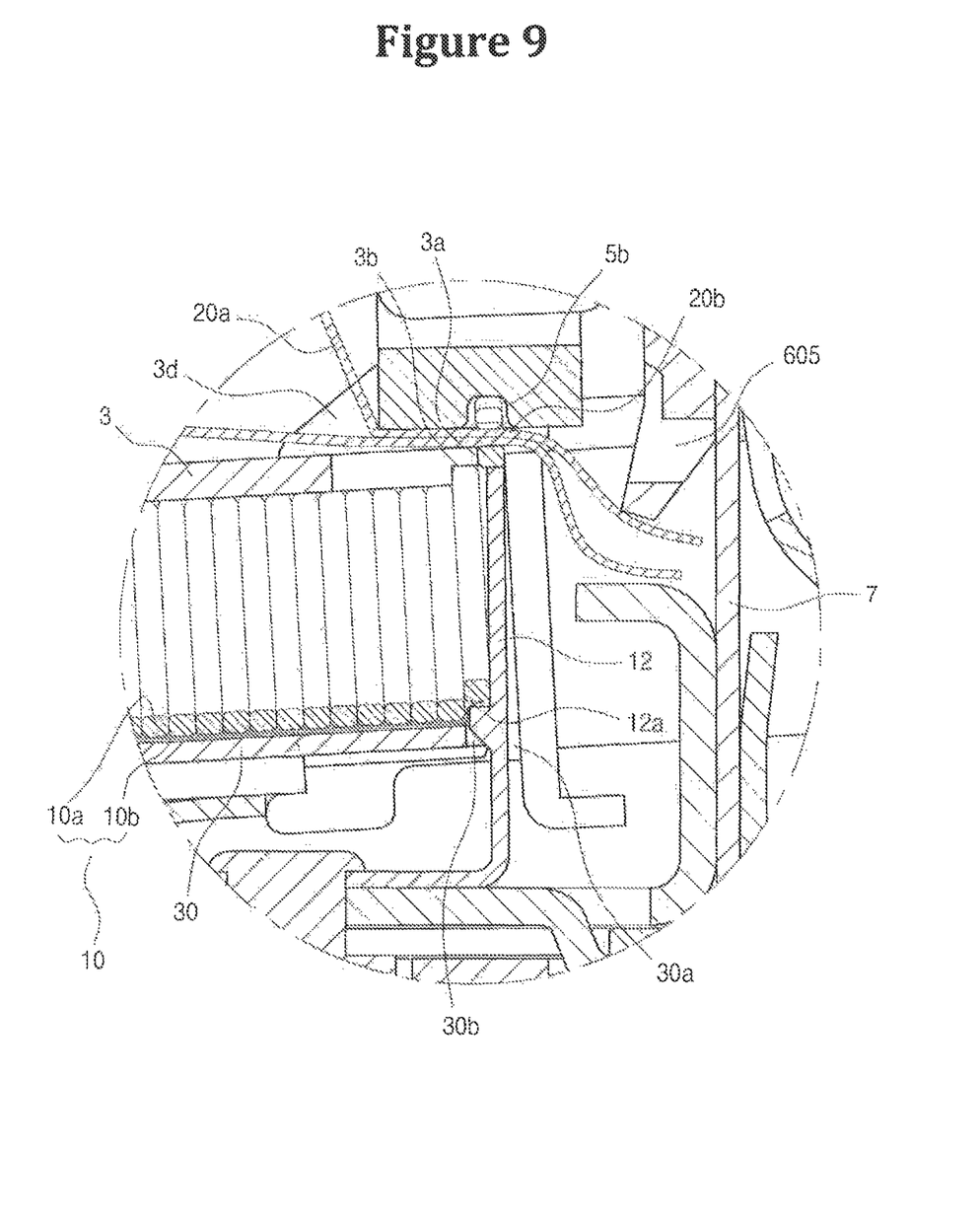
FIG. 9 is an enlarged view of the circle portion of FIG. 8.
Figure 10:
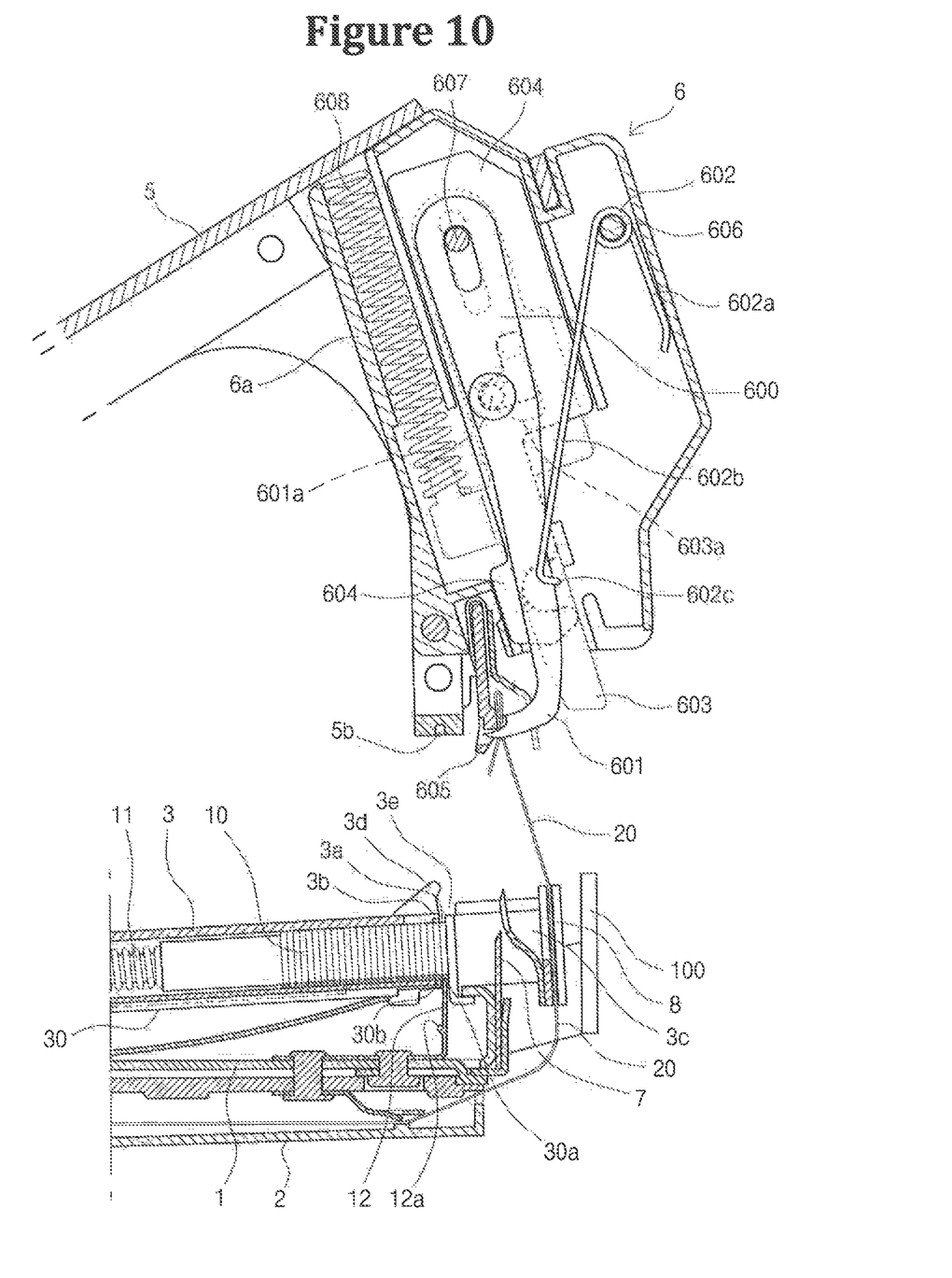
FIG. 10 is a view illustrating an example of a support strip guide part according to the present invention.
Figure 11:
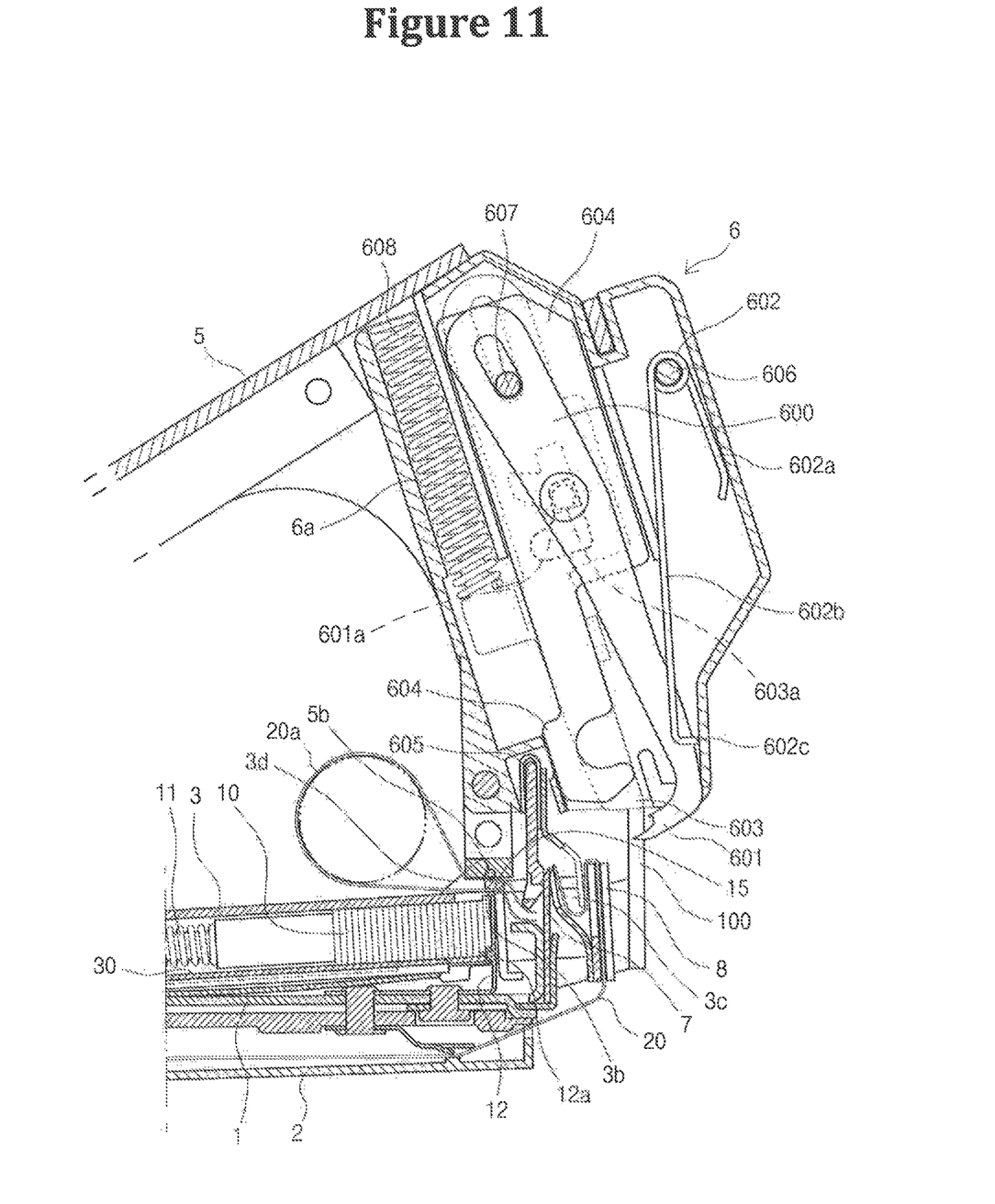
FIG. 11 is a view illustrating an operation state of FIG. 10.
Figure 12:
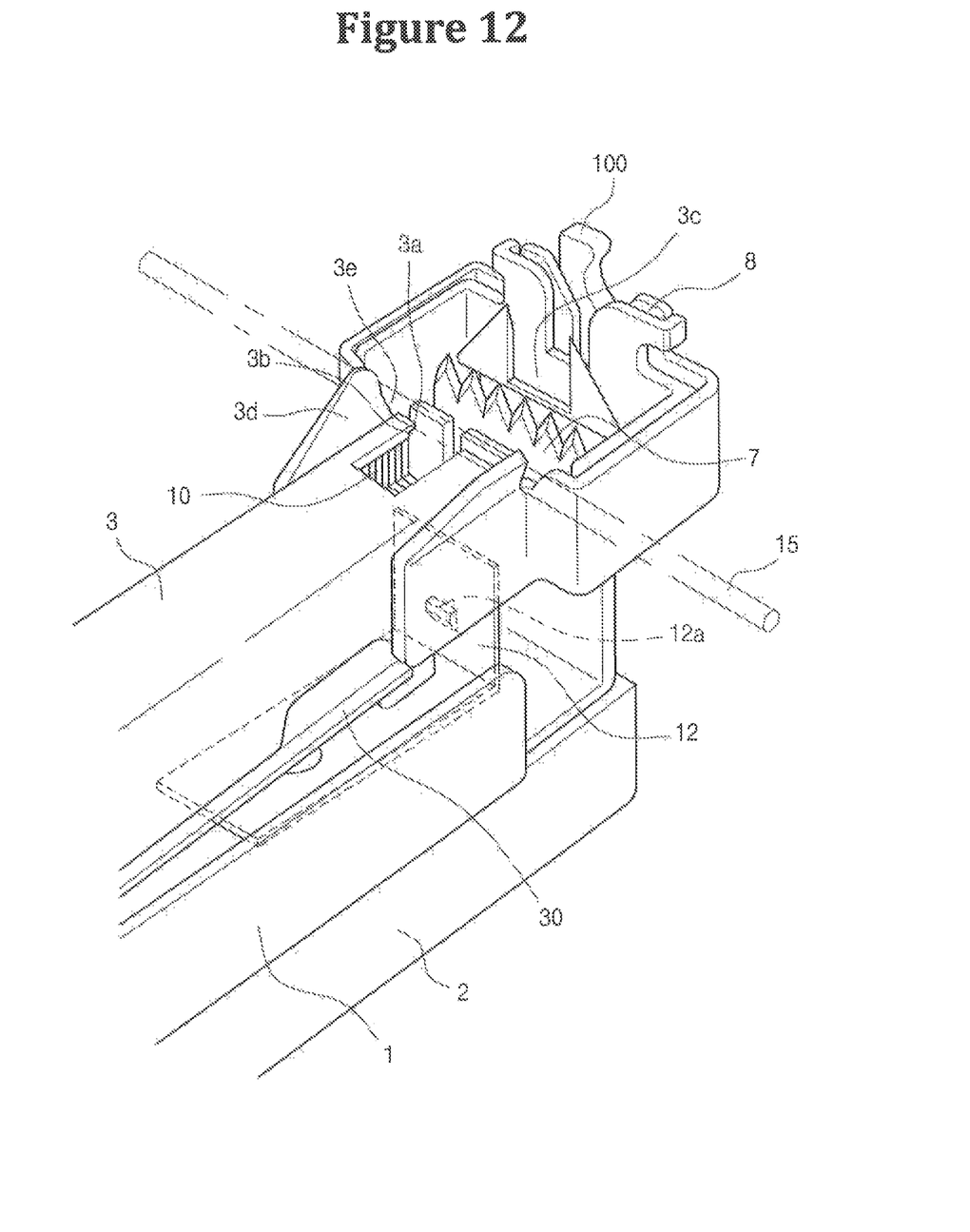
FIG. 12 is a perspective view of FIG. 10.
Figure 13:
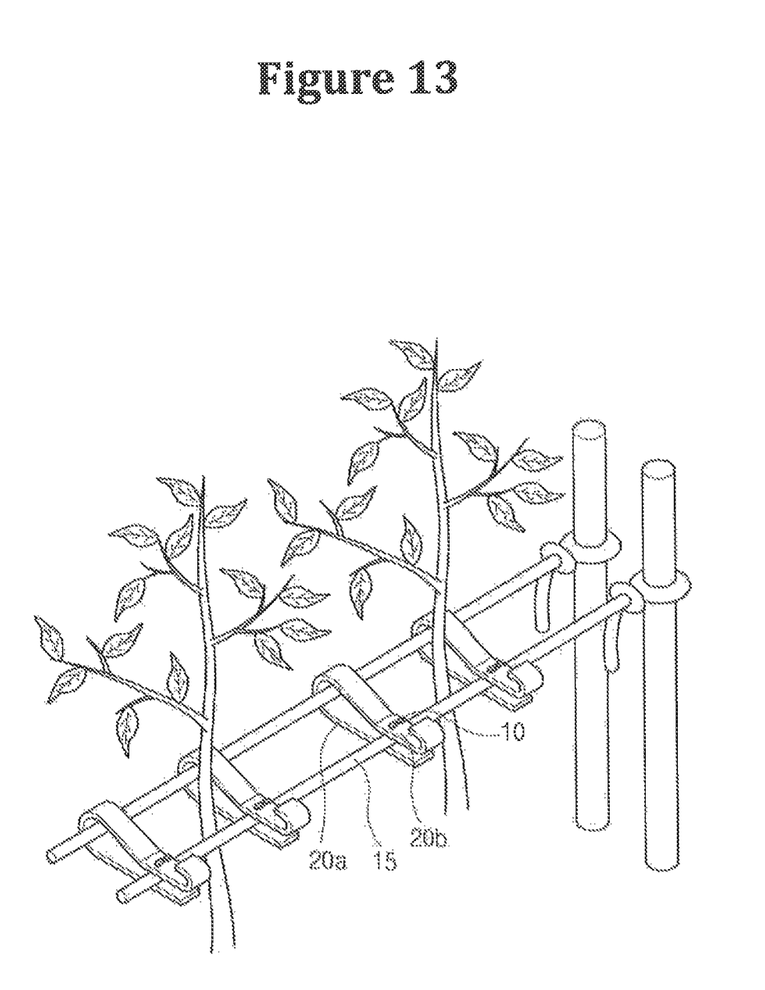
FIG. 13 is a view illustrating a state that a support strip is bound.

The tape tugging part 6 of the present invention comprises a needle plate 600 equipped with a tugging needle 601 therein, and a needle plate pressurization spring 602 which supplies elastic force to the needle plate wherein the needle plate pressurization spring has a support part 602a at an end portion of its winding part, the other end portion of which being formed of an operation part 602b equipped with an engaging part 602c at its end. It is inserted into the support rod 606 formed in the interior of the case 6a, and the support part 602a comes into close contact with the inner wall of the case 6a, and the operation part 602b is caught by an outer side of the operation unit of the tugging needle 601.

In particular, the needle plate pressurization spring 602 has features in that the length of the operation part 602b is at least two times longer than the length of the support part 602a for thereby obtaining more elastic forces, which results in reducing the input resistance of the tugging needle.

The preferred embodiments of the present invention will be described with reference to the accompanying drawings.

Figure 1:
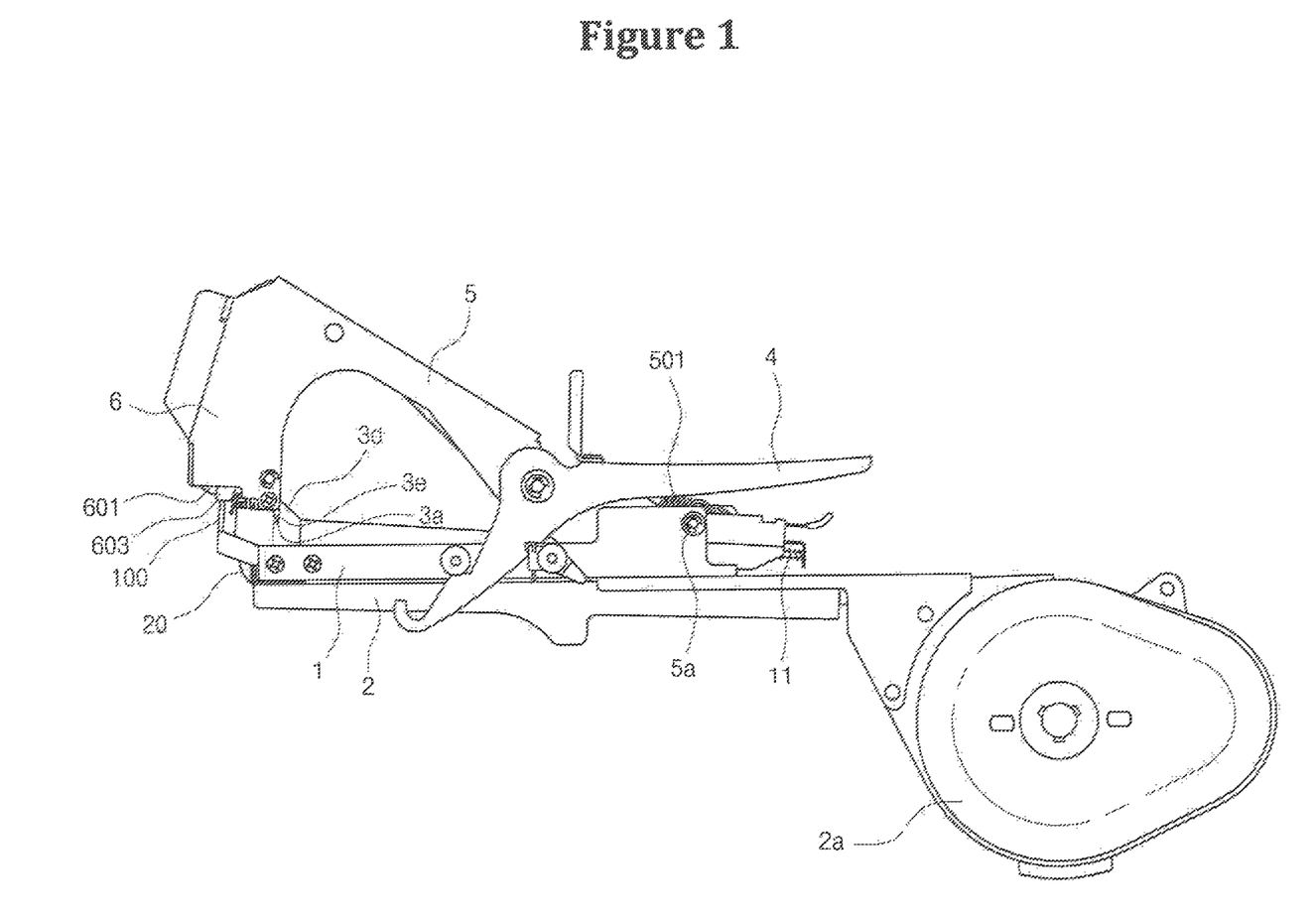
FIG. 1 is a front view illustrating a state that an operation lever is activated according to the present invention.
Figure 2:
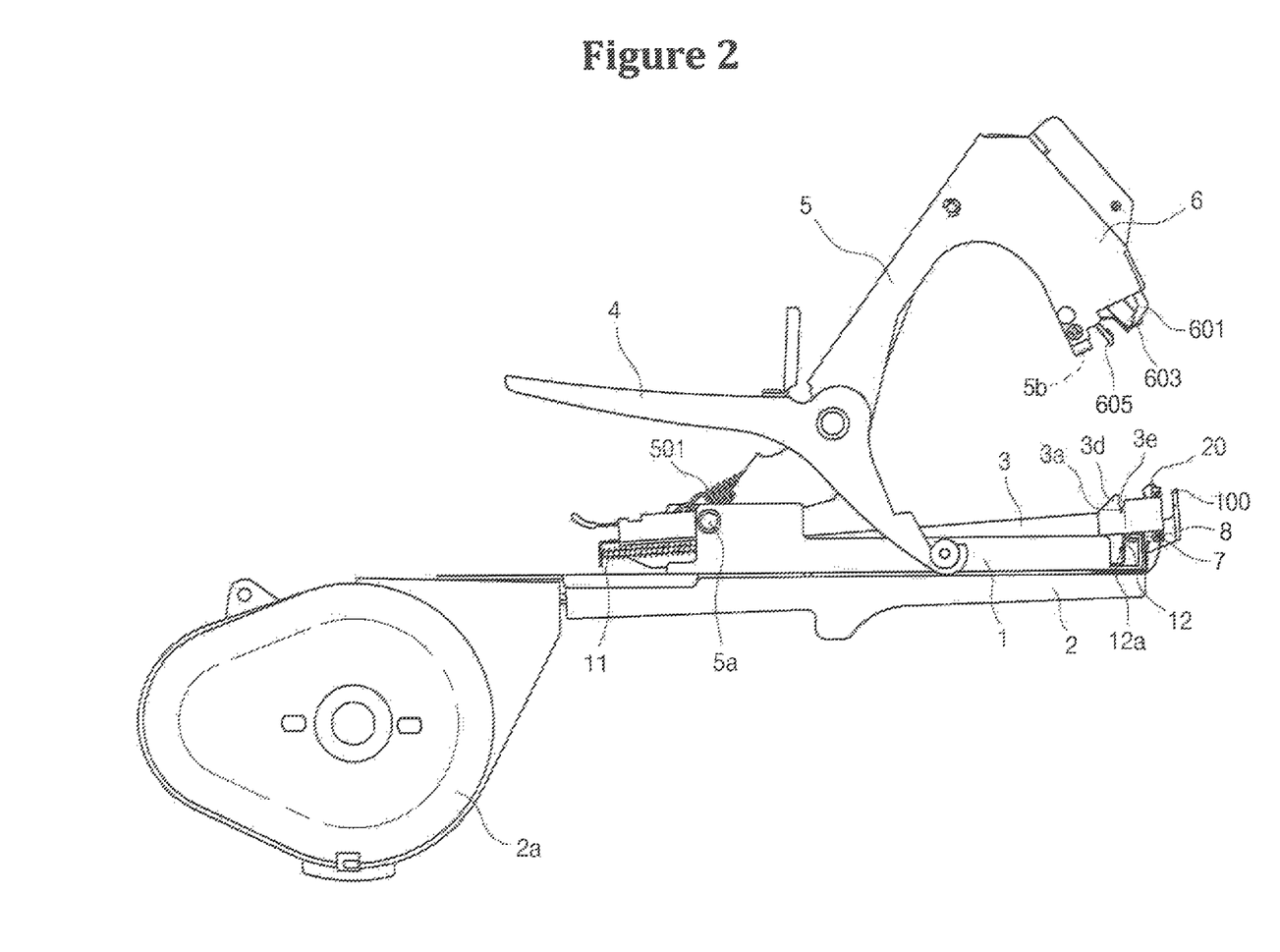
FIG. 2 is a rear view illustrating a state that an operation is released according to the present invention.

FIGS. 1 and 2 are views illustrating a lateral side of the present invention. The present invention has features in that a tape supply part 2 with a tape storage compartment 2a is installed at the bottom of the binding unit body 1, and the steel needle supply part 3 is disposed at the top of the binding unit body 1, and a steel needle exit 3a is formed at its front end. At the top of the binding unit body 1, an ascending and descending operation part 5 equipped with an operation lever 4 is disposed at a rotary shaft 5a. A tape tugging part 6 is installed at the front end of the ascending and descending operation part 5. A tugging needle 601 is disposed therein. The binding tape supplied through the tape supply unit 2 is withdrawn into a tape discharge compartment 8, and a binding ring 20a is made for thereby binding both ends of the ring, and an outer side of the binding part of the binding ring is cut off, thus finishing a binding work using a tape.

Figure 3:
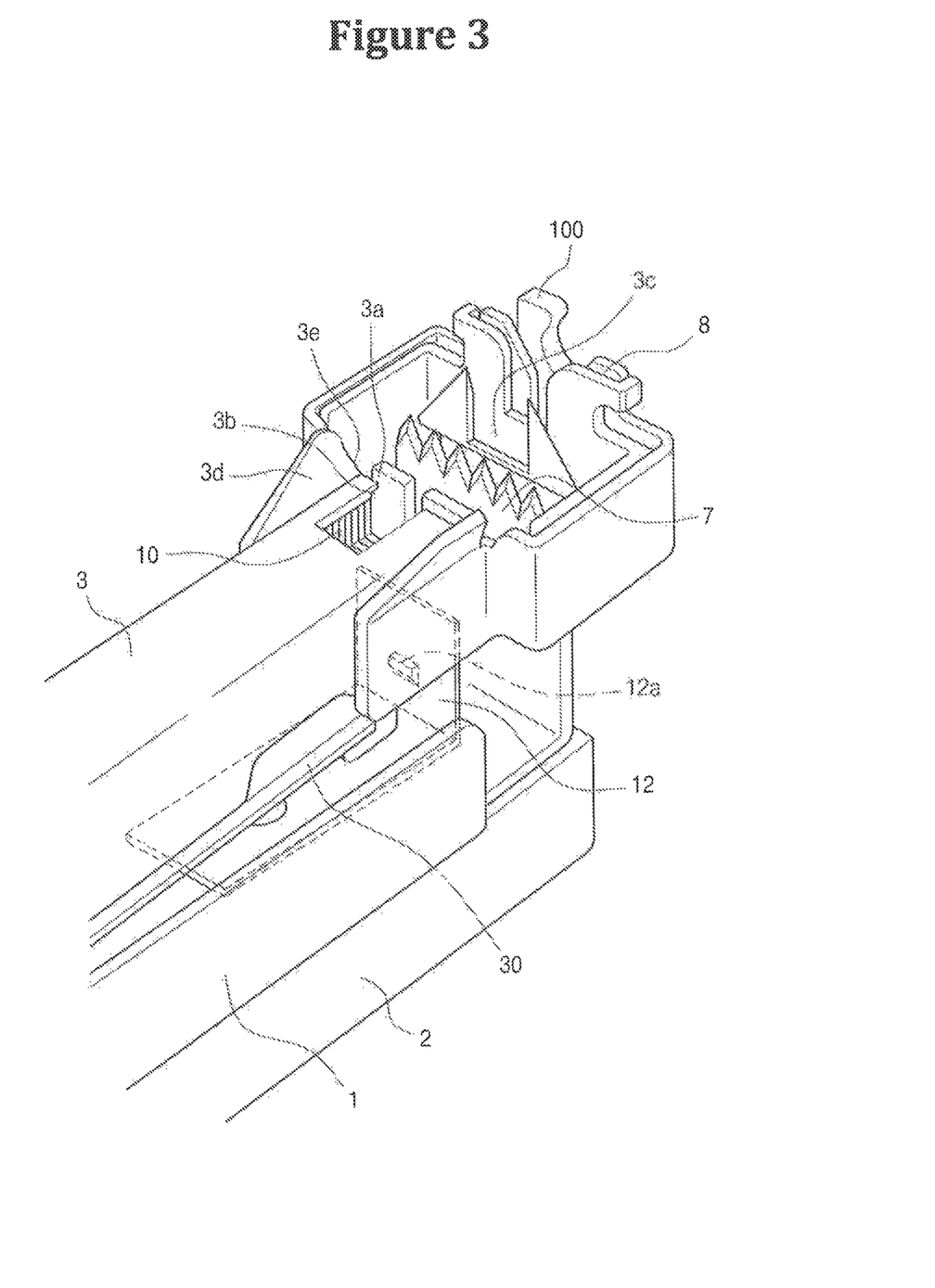
FIG. 3 is an enlarged perspective view illustrating a steel needle exit according to the present invention.

A steel needle standby groove 3b is formed at an inner side surface of the steel needle exit 3a of the present invention, and a binding steel needle separated from the steel needle group can temporarily stay therein, and a steel needle separation protrusion 12a is formed at a side surface of the steel needle extrusion plate 12 for separating one of the binding steel needles, so the separated steel needle is pushed out, thus separating one of the binding steel needles attached to the steel needle group and allowing the separated steel needle to stand by therein.

The tape tugging unit 6 installed at the ascending and descending operation part 5 has features in that an installation rod 607 is installed in the interior of the case 6a, and an operation plate 603, a guide plate 604 and a tugging needle plate 600 are inserted in sequence into the installation rod 607, and a steel needle pressurization spring 602 is inserted into the spring support rod 606 integrally formed in the interior of the case 6a, so the support part 602a formed at an end portion of the spring comes into close contact with the inner wall of one side of the case 6a. The engaging part 602c formed at the operation part 602b of the spring is inserted into an outer side surface of the tugging needle 601 of the tugging needle plate. When the tugging needle 601 moves about the installation rod 607, an elastic force can be supplied to the tugging needle 601 of the needle plate pressurization spring 602.

At this time, the operation part 602b of the needle plate pressurization spring 602 is approximately at least two times longer than the length of the support unit 602a. When the tugging needle 601 elastically operates by the needle plate pressurization spring 602, the tugging needle 601 which receives force from the engaging part 602c formed at the operation part 602b can more elastically operated. For this, when the tugging needle 601 is inputted into the front end of the binding tape so as to pull out the binding tape supplied rough the tape supply part 2, the inputting work can be performed more elastically for thereby preventing the input port from being damaged, which results in an accurate withdrawing operation of the binding tape. Thanks to the above-mentioned operations, the binding work using the binding work can be more reliable, and any possible damages of the binding case can be prevented, thus preventing the over consumptions of the binding tape. In the middle of the binding steps of the binding tape, the ascending and descending operation unit descends, and the operation plate 603 is formed to face inwards, and the shaft rod 601a of the tugging needle plate 600 receives elastic force from the coil spring and is caught by the engaging shoulder of the top of the operation hole 603a formed at the center of the operation plate 603. When the operation plate 603 is forced to face the interior of the operation part, the shaft rod 601a of the tugging needle 601 caught by the engaging shoulder of the top of the operation hole 603a of the operation plate 603 descends by elastic force of the needle plate pressurization spring 602, and the tugging needle 601 also descends, so it travels to the binding tape and is inputted into the end portion of the tape. When the ascending and descending operation unit ascends, the binding tape which is supplied through the tape supply unit 2 can be withdrawn. The withdrawn tape binds the pole and the agricultural crop and forms a ring, and the binding steel needle is extruded and binds both ends of the ring. When the above mentioned binding operations are finished, the operation plate 603 and the needle plate 600 returns back to their original positions by means of the operation spring 608, and stand by for the next operations.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

| Legend of Elements | |
| --- | --- |
| 1: binding unit body | |
| 2: tape supply part | 2a: tape accommodation compartment |
| 3: steel needle supply part | 3a: steel needle exit |
| 3b: steel needle standby groove | 3c: tape cutting compartment |
| 4: operation lever | 5: ascending and descending operation part |
| 5a: rotary shaft | 5b: binding steel needle bending and forming part |
| 6: tape tugging part | 6a: case |
| 7: cutting knife | 8: tape discharge compartment |
| 10: steel needle group | 10a: binding steel needle |
| 10b: adhesive | 11: spring |
| 12: steel needle extrusion plate | 12a: steel needle separation protrusion |
| 20: binding tape | 20a: binding ring |
| 20b: binding part | 30: steel needle cover |
| 30a: input port | 30b: guide groove |
| 100: operation protrusion | 501: returning spring |
| 600: needle plate | 601: tape tugging needle |
| 601a: shaft rod | 62: steel needle pressurization spring |
| 602a: support part | 602b: operation part |
| 602c: engaging part | 603: operation plate |
| 603a: operation hole | 604: guide plate |
| 606: spring support rod | 608: operation spring |

What is claimed is:

1. A binding machine for agriculture, the machine comprising:
    a binding unit body:
    a cutting knife installed at the binding unit body;
    a steel needle supply part installed on the binding unit body, and comprising
        a steel needle exit provided at a front end of the steel needle supply part, and configured to load a steel needle group formed by bonding a plurality of steel needles with an adhesive so that edges of the plurality of steel needles are close to one another,
        a steel needle standby groove formed at an inner side surface of a boundary area of the steel needle exit, and
        a spring disposed at an opposite side to the front end of the steel needle supply part and configured to push the steel needle group to the steel needle exit from the opposite side;
    a steel needle cover installed at an inner side of the steel needle supply part, and comprising an input port formed at a front end of the steel needle cover;
    a steel needle extrusion plate attached to the binding unit body and configured to push out a steel needle from the loaded steel needle group through the input port;
    a steel needle separation protrusion disposed at an inner side surface of the steel needle extrusion plate and having a width sufficient to break the bond between the steel needle and the steel needle group forming a standby steel needle, the standby steel needle being pushed by the steel needle separation protrusion out of the steel needle group and into the steel needle standby groove;

a guide groove formed at a center portion of the input port for allowing the steel needle separation protrusion to pass;

a tape cutting compartment formed at a front portion of the binding unit body;

a tape discharge compartment formed at the front portion of the binding unit body;

a tape storage compartment provided at a rear portion of the binding unit body and configured to install a tape reel comprising a binding tape, wherein the binding tape is supplied to the tape discharge compartment from the tape reel;

an ascending and descending operation part equipped with an operation lever, connected to a rotary shaft and installed on a top portion of the binding unit body via the rotary shaft, and configured to ascend by a return spring and descend by the operation lever;

a tape tugging unit comprising a tugging needle and an operation plate, and disposed at a front end of the ascending and descending operation part; and a binding steel needle bending and forming part disposed at the front end of the ascending and descending operation part, wherein when the operation plate is compressed against an operation protrusion of the binding unit body by the descended ascending and descending operation part, the tugging needle operates inwards and pecks at an end portion of the binding tape which stays in the tape discharge compartment for thereby forming a binding ring, both ends of the binding ring are bound by the pushed out steel needle, and an outer part of an engaging part of the binding ring is cut off by the cutting knife.

2. A binding machine for agriculture, the machine comprising:

a binding unit body:

a cutting knife installed at the binding unit body;

a steel needle supply part installed on the binding unit body, and comprising a steel needle exit provided at a front end of the steel needle supply part, and configured to load a steel needle group formed by bonding a plurality of steel needles with an adhesive so that edges of the plurality of steel needles are close to one another, a steel needle standby groove formed at an inner side surface of a boundary area of the steel needle exit, and a spring disposed at an opposite side to the front end of the steel needle supply part and configured to push the steel needle group to the steel needle exit from the opposite side;

a steel needle cover installed at an inner side of the steel needle supply part, and comprising an input port formed at a front end of the steel needle cover;

a steel needle extrusion plate attached to the binding unit body and configured to push out a steel needle from the loaded steel needle group through the input port;

a steel needle separation protrusion disposed at an inner side surface of the steel needle extrusion plate and having a width sufficient to to break the bond between the steel needle and the steel needle group forming a standby steel needle, the standby steel needle being pushed by the steel needle separation protrusion out of the steel needle group and into the steel needle standby groove;

a guide groove formed at a center portion of the input port for allowing the steel needle separation protrusion to pass;

a tape cutting compartment formed at a front portion of the binding unit body;

a tape discharge compartment formed at the front portion of the binding unit body;

a tape storage compartment provided at a rear portion of the binding unit body and configured to install a tape reel comprising a binding tape, wherein the binding tape is supplied to the tape discharge compartment from the tape reel;

an ascending and descending operation part equipped with an operation lever, connected to a rotary shaft and installed on a top portion of the binding unit body via the rotary shaft, and configured to ascend by a return spring and descend by the operation lever;

a tape tugging unit comprising a tugging needle and an operation plate, and disposed at a front end of the ascending and descending operation part;

a binding steel needle bending and forming part disposed at the front end of the ascending and descending operation part; and a support strip guide groove formed between a top portion of an outer side of the steel needle exit and the binding steel needle bending and forming part and configured to accommodate a support strip, wherein when the operation plate is compressed against an operation protrusion of the binding unit body by the descended ascending and descending operation part, the tugging needle operates inwards and pecks at an end portion of the binding tape which stays in the tape discharge compartment for thereby forming a binding ring, both ends of the binding ring are bound by the pushed out steel needle, and an outer part of an engaging part of the binding ring is cut off by the cutting knife.

* * * * *